United States Patent [19]

Oldham

[11] Patent Number: 4,621,167

[45] Date of Patent: Nov. 4, 1986

[54] SUBMARINE CABLE ANCHORED TO A REPEATER HOUSING AND METHOD OF ASSEMBLY THEREOF

[75] Inventor: Ronald C. Oldham, Chandlers Ford, England

[73] Assignee: Standard Telephones and Cables Public Limited Company, London, England

[21] Appl. No.: 700,980

[22] Filed: Feb. 12, 1985

[30] Foreign Application Priority Data

Feb. 25, 1984 [GB] United Kingdom ................. 8404968

[51] Int. Cl.⁴ .................... H02G 15/007; H02G 15/14; G02B 6/36
[52] U.S. Cl. ................ 174/70 S; 29/419 R; 174/79; 174/DIG. 12; 350/96.20
[58] Field of Search ............ 174/70 S, 79, 88 R, 174/88 C, DIG. 12; 29/419 R; 350/96.20

[56] References Cited

U.S. PATENT DOCUMENTS 4,217,464 8/1980 Oldham .................................. 174/79

FOREIGN PATENT DOCUMENTS

| 0089057 | 9/1983 | European Pat. Off. |
| 817643 | 8/1959 | United Kingdom ....... 174/DIG. 12 |
| 983737 | 2/1965 | United Kingdom ....... 174/DIG. 12 |
| 1538058 | 1/1979 | United Kingdom . |
| 2000390 | 1/1979 | United Kingdom . |
| 2042817 | 9/1980 | United Kingdom . |
| 2097149 | 10/1982 | United Kingdom . |

Primary Examiner—Laramie E. Askin
Attorney, Agent, or Firm—Kerkam, Stowell, Kondracki & Clarke

[57] ABSTRACT

A fibre optic lightweight submarine cable (2) is terminated to a tail cable (4) and anchored to a repeater housing (9) with preformed high-tensile steel anchor wires (1,3). The wires are clamped at one end (10) between a collar (7) and frusto-conical clamping segments (11) and strapped at the other end with binders (14). Over the tail cable portion is a spring (6) located on ferrules (6A, 7A) and acting to prevent the anchor wires crushing the tail cable (4).

5 Claims, 4 Drawing Figures

SUBMARINE CABLE ANCHORED TO A REPEATER HOUSING AND METHOD OF ASSEMBLY THEREOF

FIELD OF THE INVENTION

This invention relates to anchoring a lightweight submarine cable to a repeater housing, particularly for terminated lightweight fibre optic submarine cables.

Present day submarine telecommunications cables fall into two categories. The first category is a generally lightweight cable comprising a central conductor, which may be a fibre optic conductor, surrounded by a high tensile strength member for taking the tensile loads which the cable has to bear, an electrical conductor to supply power to the repeaters, and a dielectric sheath in order to insulate the electrical conductor from the surrounding water. The second type of cable is similar to the lightweight type just described, except that it has an outer armouring layer or layers to protect the cable from chafing and from trawler and anchor damage.

The first type of cable, the lightweight cable, is used in deep water applications where the likelihood of damage from chafing and anchors is negligible. The second type of cable is used in shallow water and landfall applications where the likelihood of damage from chafing, fishing vessels and anchors is high.

PRIOR ART

Connecting the second type of cable to a repeater housing poses little problem because the armour wires can be used to effect the connection. The first type of cable poses greater difficulty and it has been a practice in the past to armour the end portion of the cable so that for all intents and purposes it is similar to the armoured cable for the purposes of connecting it to the repeater housing.

PROBLEM THE INVENTION HAS TO SOLVE

The application of armour wires to the end portion of a lightweight cable is an expensive and time consuming task, requiring as it does, passing the lightweight cable through a conventional armouring machine for a very short run.

It is an object of the present invention to provide a simplified cable anchorage which is inexpensive yet effective for anchoring a submarine cable end to a repeater housing.

SUMMARY OF THE INVENTION

According to the present invention there is provided a method of securing a terminated submarine cable to a repeater housing comprising snapping helically-preformed high tensile anchor wires onto the joint portion of the termination and an adjoining portion of the cable, there being a pressure resisting cylindrical collar beneath the anchor wires at the end of the cable, clamping the ends of the preformed armour wires between an external clamping arrangement secured to the repeater housing and the internal pressure resisting cylindrical collar, and clamping the armour wires towards the other ends onto the submarine cable.

The preformed wires can be formed singularly and snapped individually onto the terminated cable, or preferably they are glued into subsets in groups of three or four and then assembled around the cable mutually conforming as to hand of lay, internal helical diameter and pitch length. Preferably the external clamping arrangement comprises the parallel internal fitting grip collar to provide the internal pressure resisting core, and parallel-bored external-tapered segments which are clamped against a plate so that the conical taper drives the segments inwardly to clamp the armour wires.

Preferably the collar and the segments have co-operating teeth about 10 thousands of an inch deep, to have a limited bite into the wires without weakening them.

The armour wires are strapped at their other ends around the cable with wire binders or stainless steel strapping, to clamp them to the cable.

As an alternative, the preformed armour wires may be formed complete around a mandrel, then taken off in groups of three or four and glued together into subsets.

The armour wires are preferably coated with a vinyl synthetic adhesive and can be dusted with grit.

BRIEF DESCRIPTION OF THE DRAWINGS

In order that the invention can be clearly understood, reference will now be made to the accompanying drawings in which.

EMBODIMENTS OF THE INVENTION

Figure 1:
FIG. 1 shows a single preformed armour wire for use in terminating a submarine optical fibre cable according to a first embodiment of the invention.
Figure 3:
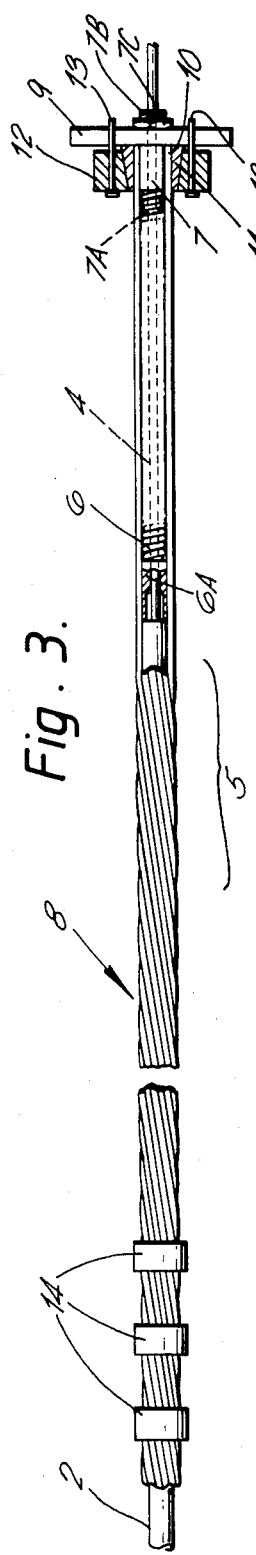
FIG. 3 shows the armour wires of FIG. 1 or FIG. 2 applied to a terminated lightweight submarine optical fibre cable according to an embodiment of the present invention.

Referring to FIG. 1 the preformed armour wire comprises a vinyl synthetic adhesive coated high tensile steel wire 1 which has a helical pitch of about 18 inches and an internal helix diameter slightly less than the outer diameter of the terminated cable 2 shown in FIG. 3. The diameter of the cable lies in the range 1 inch to $1\frac{3}{4}$ inches and the preformed wire has a diameter in the range of 0.120 inch to 0.220 inch.

Figure 2:
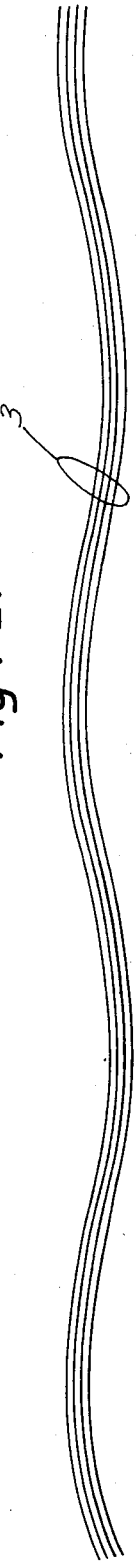
FIG. 2 shows a subset of armour wires each similar to FIG. 1 and glued together.

Referring to FIG. 2 there is shown a subset of armour wires 3 each as shown in FIG. 1 but glued together with a synthetic resin. These wires are glued in subsets of three or four and can either be formed singularly such as the one shown in FIG.1 or can be formed complete around a mandrel (not shown) and then taken off in groups of three or four and subsequently glued together with a vinyl synthetic adhesive (GRIPSOTITE XN19) and dusted with aluminium oxide or carbon grit of e.g. Grade 100.

Referring to FIG. 3 a terminated cable 2 is terminated to a smaller diameter tail cable 4 at a joint extending over the length 5. Around tail cable 4 is a helical spring 6 which supports the armour wires over the tail cable and allows tail cable bending over the end portion. At the very end a parallel sided internal fitting grip collar 7 is secured to the spring 6. This resists the radial clamping pressure of the segments 11. It also has circumferential teeth which bite into the wires to a depth of about 0.01 inch.

Figure 4:
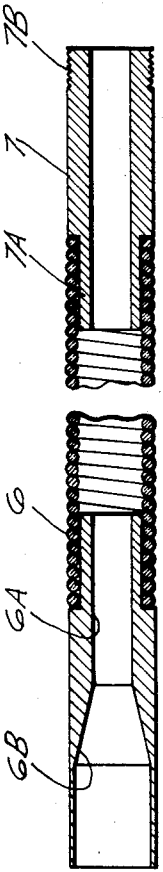
FIG. 4 shows part of FIG. 3 on a larger scale.

The spring 6 is located at one end on a spigot 6A which has a tapered interior 6B to fit over the tapered end of the termination 5, and at the other end on a spigot 7A of the collar 7 (see FIG. 4).

The collar 7 has a threaded end 7B so it can be passed through a hole in the anchor plate 9 and be locked thereto with a nut 7C.

Preformed anchor wires such as shown in FIG. 1 or FIG. 2 are snapped around the cable 2 and are indicated generally by the reference numeral 8. A plate 9 schematically represents a mounting plate at the end of a submersible repeater housing and the ends 10 of the armour wires are clamped between parallel bored externally tapered segments 11 and an internally conically tapered clampring 12. The clampring 12 is drawn towards the plate 9 by bolts such as 13, so that the tapered segments 11 tightly grip the ends of the preformed armour wires against the fitting grip collar 7. The tapered segments, like the collar 7, have inward teeth, which bite into the wires by a limited amount.

At the other end of the armour wires are wire binders or stainless steel strappings 14 which clamp the wires to the cable.

The anchor wires have a length in the range eighteen to twenty five feet and are helically formed with a helix having an internal diameter such as to be capable of being wrapped around the cable and with an open pitch of about eighteen inches and sufficient to enable the wire to be wrapped around the cable from the side without exceeding the elastic limit of the wire.

TECHNICAL ADVANTAGES

As can be seen, the anchoring arrangment described is simple and yet has been found effective in terminating a lightweight submarine cable to a repeater housing. The preformed wires have a breaking strength of between 70 and 80 tons per square inch and this invention enables the use of such wires to anchor a submarine cable quickly and efficiently. In particular, there is no need to splay the wires up a conical taper which would disturb the wires and may affect their strength. Thus, the wires lie on a cylindrical surface throughout their length, which is particularly advantageous.

I claim:

1. A method of securing a terminated submarine cable to a repeater housing, the cable having a joint portion and an adjoining portion, the method comprising: snapping helically-performed high tensile anchor wires onto the joint portion and the adjoining portion, providing a pressure resisting cylindrical collar beneath the ends of the anchor wires at the end of the cable, providing an external repeater housing clamping arrangement, clamping the ends of the preformed anchor wires between the clamping arrangement and the pressure resisting cylindrical collar, and clamping the anchor wires towards the other ends onto the submarine cable.

2. A method as claimed in claim 1, comprising assembling the preformed anchor wires individually onto the cable.

3. A method as claimed in claim 1, wherein sets of the preformed anchor wires are bonded together, said method comprising applying the bonded sets to the cable.

4. A method as claimed in claim 1, comprising coating the anchor wires with adhesive which holds grit to improve the grip of the anchor wires.

5. A terminated submarine cable having a joint portion and being secured to a repeater housing, comprising: a plurality of high tensile helically preformed anchor wires tightly embracing and gripping the joint portion and an adjoining portion of the cable, a pressure resisting cylindrical collar beneath the anchor wires at an end of the cable, and an external clamping arrangement secured to the repeater housing and clamping the anchor wires onto the collar, and a further clamping arrangment clamping the anchor wires onto said adjacent portion of the cable.

* * * * *